United States Patent
Reybrouck et al.

(10) Patent No.: US 11,937,601 B2
(45) Date of Patent: Mar. 26, 2024

(54) METHOD FOR TREATMENT OF SOYBEAN RUST

(71) Applicant: Globachem NV, Sint-Truiden (BE)

(72) Inventors: Stefaan Reybrouck, Sint-Truiden (BE); Koen Quaghebeur, Sint-Truiden (BE)

(73) Assignee: GLOBACHEM NV, Sint-Truiden (BE)

( * ) Notice: Subject to any disclaimer, the term of this patent is extended or adjusted under 35 U.S.C. 154(b) by 186 days.

(21) Appl. No.: 17/225,471

(22) Filed: Apr. 8, 2021

(65) Prior Publication Data

US 2022/0046918 A1   Feb. 17, 2022

(30) Foreign Application Priority Data

Aug. 13, 2020 (EP) .................................. 20190936

(51) Int. Cl.
| | | |
|---|---|---|
| *A01N 37/18* | (2006.01) | |
| *A01N 35/10* | (2006.01) | |
| *A01N 43/40* | (2006.01) | |
| *A01N 43/653* | (2006.01) | |

(52) U.S. Cl.
CPC .............. *A01N 37/18* (2013.01); *A01N 35/10* (2013.01); *A01N 43/40* (2013.01); *A01N 43/653* (2013.01)

(58) Field of Classification Search
CPC ........ A01N 35/10; A01N 37/18; A01N 37/20; A01N 43/40; A01N 43/653; A01P 3/00
See application file for complete search history.

(56) References Cited

U.S. PATENT DOCUMENTS

| | | |
|---|---|---|
| 2005/0032903 A1 | 2/2005 | Suarez-Cervieri et al. |
| 2007/0010401 A1 | 1/2007 | Noon et al. |
| 2008/0039481 A1 | 2/2008 | Kemper et al. |
| 2008/0287299 A1 | 11/2008 | Martins Dos Santos |
| 2009/0023687 A1* | 1/2009 | Haas ...................... A01N 57/20 514/383 |
| 2009/0105311 A1 | 4/2009 | Dunkel et al. |
| 2010/0099559 A1 | 4/2010 | Dietz et al. |
| 2011/0092466 A1 | 4/2011 | Groeger et al. |
| 2011/0152097 A1* | 6/2011 | Stenzel .................. A01N 57/20 514/93 |
| 2011/0312493 A1 | 12/2011 | Oostendorp et al. |

FOREIGN PATENT DOCUMENTS

| | | |
|---|---|---|
| EP | 0600629 A1 * | 6/1994 |
| WO | 2005122771 A1 | 12/2005 |
| WO | 2006024521 A1 | 3/2006 |
| WO | 2006066810 A2 | 6/2006 |
| WO | 2006102657 A2 | 9/2006 |
| WO | 2007068420 A1 | 6/2007 |

OTHER PUBLICATIONS

Sweets (University of Missouri Extension, 2008). (Year: 2008).*
Giesler et al. (NebFact, University of Nebraska, Lincoln, Plant Diseases Field Crops, Apr. 2005) (Year: 2005).*
M. Enz and Ch. Dachler, "Compendium of Growth Stage Identification Keys for Mono- and Dicotyledonous Plants, Extended BBCH scale," 2nd Edition 1997, ISBN 3-9520749-3-4.

* cited by examiner

*Primary Examiner* — Umamaheswari Ramachandran
(74) *Attorney, Agent, or Firm* — Dinsmore & Shohl LLP

(57) ABSTRACT

Methods for controlling and/or treating of phytopathogenic fungi causing soybean rust infections in plants include applying a fungicidally effective amount of a composition to the plants, and/or seeds of the plants, or soil in which the plants are growing, or soil in which the plants are desired to grow. The composition includes zoxamide, optionally in combination with one or more additional active ingredients selected from the group consisting of strobilurins and/or triazole compounds. The phytopathogenic fungi are selected from *P. pachyrhizi* or *P. meibomiae*. The zoxamide is applied in an amount of about 10 g/ha to about 2000 g/ha.

15 Claims, No Drawings

METHOD FOR TREATMENT OF SOYBEAN RUST

CROSS-REFERENCES TO RELATED APPLICATIONS

This application claims the benefit of priority under 35 U.S.C. § 119 to European Application No. 20190936.3, filed Aug. 13, 2020, which application is incorporated by reference herein in its entirety.

TECHNICAL FIELD

The present application relates to methods of controlling, preventing and/or treating of phytopathogenic fungi causing soybean rust and, more specifically to methods including the use of zoxamide as an active agent against soybean rust and agricultural compositions thereof.

BACKGROUND

Soybean is one of the most important commercial crops worldwide, however, yield and quality are heavily affected by soybean rust disease which occurs in most of the major soybean-growing regions.

Soybean rust, incited by *Phakopsora pachyrhizi* and *P. meibomiae* fungi, is the most destructive foliar disease of soybean, and yield losses of over 50% are common when environmental conditions are favorable, and the disease is not adequately treated.

Early soybean rust symptoms are most commonly observed on the leaves in the lower canopy, but due to the rapid spread of disease and deterioration of the leaf tissue, resulting in drying and premature defoliation, photosynthesizing ability of the plant is reduced and the formation of the full grain is precluded, which consequently results in reduction of seed number per pod, decreased seed size, and decreased number of filled pods per plant. The earlier the defoliation occurs, the greater is the yield loss.

To prevent the disease from developing, fungicides need to be applied upon early infection and should protect the entire canopy of the plant. The number of fungicidal applications needed is dependent upon how early in the season the disease is caught and weather conditions in the region. Soybean rust usually requires, depending on the severity of the disease, two to four applications. However, the fungicide treatments can increase from four to eight applications in regions having more than one soybean season per year.

Due to such frequent use of fungicides with same or similar mode of action or rotating use of fungicides with only two to three different modes of action, there is also a serious threat of developing fungicidal resistance of *Phakopsora pachyrhizi*.

Current market-available, soybean rust treatments include foliar treatment with fungicides such as strobilurins such as azoxystrobin, trifloxystrobin, pyraclostrobin, pyrazole-carboxamides such as fluxapyroxad, benzovindiflupyr, triazoles, for example tebuconazole, propiconazole, tetraconazole, myclobutanil; chlorothalonil, mancozeb or copper compounds, as well as commercial formulations in the form of mixtures, such as azoxystrobin and tetraconazole, azoxystrobin and tebuconazole, azoxystrobin and propiconazole, pyraclostrobin and fluxapyroxad, propiconazole and trifloxystrobin, tebuconazole and fluoxastrobin, etc.

Further soybean rust treatments are disclosed in the following documents:

US 2005/0032903 discloses use of strobilurin formulations for controlling rust in legumes.

US 2007/0010401 discloses combinations of triazole fungicide and glyphosate herbicide for controlling rust disease in soybean.

US 2008/0287299 discloses use of fluconazole against *Phakopsora pachyrhizi*.

US 2008/0039481 discloses treatment of soybean seeds with various fungicides against soybean rust.

US 2009/0105311 discloses use of certain carboxamides for controlling soybean rust.

US 2010/0099559 discloses combination of active ingredients against *P. pachyrhizi*.

US 2011/0092466 relates to compositions comprising at least one carboxamide and at least one further compound selected from strobilurins and triazoles for controlling rust fungi.

US 2011/0312493 describes treatment of soybean rust by applying different pesticidal compositions.

WO 2005/122771 discloses use of various fungicides for combating rust on soya.

WO 2006/024521 discloses use of fluquinconazole for treatment of soybean rust.

WO 2006/066810 describes use of orysastrobin and mixtures thereof for controlling rust.

WO 2006/102657 discloses use of flutriafol for protection of soybean against rust.

WO 2007/068420 relates to a method of controlling *P. pachyrhizi* by applying to the soybean plants a combination of cyproconazole and difenoconazole.

Additional soybean rust disease control options are very limited. Practices such as planting date, row spacing and crop rotation sequences have no or little effect and, to this day, resistant soybean cultivars do not exist. To make matters even worse, *P. pachyrhizi* has a broad host range and can infect and sporulate other legumes including beans, kudzu, pea and many more. Therefore, to effectively prevent, control and/or treat soybean rust, effective fungicides are, and will be, of the utmost importance.

SUMMARY

Embodiments herein provide an effective treatment of soybean rust, based on a finding that zoxamide exhibits high activity against soybean rust causing fungi, *Phakopsora pachyrhizi* and *P. meibomiae*, and can be used to prevent, to control, and/or to treat soybean rust disease. Zoxamide (3,5-dichloro-N-(3-chloro-1-ethyl-1-methyl-2-oxopropyl)-4-methyl benzamide) is a benzamide fungicide active against grape downy mildew and potato late blight.

Embodiments herein relate to methods for controlling, preventing, and/or treating phytopathogenic fungi causing soybean rust. The methods include treating the plants, the seeds, or the soil by spraying or dusting with a fungicidally effective amount of zoxamide.

According to embodiments, the phytopathogenic fungi is selected from *Phakopsora pachyrhizi* and *P. meibomiae*.

In some embodiments, the plant is a legume plant. Furthermore, legume plant may be selected from soybean, bean, kudzu and pea.

According to embodiments, zoxamide may be applied in an amount from about 10 g/ha to about 2000 g/ha, about 100 g/ha to about 1000 g/ha, about 100 g/ha to about 500 g/ha, about 50 g/ha to about 200 g/ha, about 90 g/ha to about 180 g/ha. Furthermore, zoxamide may be applied in amount of about 90 g/ha, about 120 g/ha and/or about 180 g/ha.

Furthermore, according to embodiments, zoxamide may be used in combination with one or more compounds selected from the group of: (a) benzimidazole compounds, (b) carboxamide compounds, (c) copper compounds, (d) dithiocarbamate compounds, (e) organochlorine compounds, (f) pyrimidine compounds, (g) pyrrole compounds, (h) strobilurin compounds, (i) triazole compounds, (j) thiophenecarboxamides; and, mixtures of any of (a)-(j).

According to embodiments, zoxamide may be used in combination with strobilurin compounds and/or triazole compounds.

Compounds as specified above, may be applied simultaneously with zoxamide, for example applied separately or in the form of a mixture, before zoxamide or after zoxamide on the plant.

In further embodiments, controlling, preventing and/or treating the plant is performed prior to planting as a seed treatment, after the planting and prior to detection of disease symptoms and/or after the infection occurs.

In further embodiments, zoxamide is applied as a foliar treatment.

In further embodiments, zoxamide is applied by spraying or dusting.

DETAILED DESCRIPTION

The following description and examples are shown for exemplary and explanatory purposes and are not intended to limit the scope of the present invention.

The features and characteristics illustrated and/or described herein in connection with various examples presented herein may be combined with the features and characteristics of other examples also provided herein and such modifications and variations are intended to be included within the scope of the present invention.

Definitions

For the purpose of the present disclosure, following terms and abbreviations have the following meaning:

As used herein, term "fungicidally effective amount" means the relative amount that is effective to inhibit or control fungus growth rate, increase mortality or eradicate the fungus when the fungicidal composition is applied to the target fungus at a given application rate.

As used herein, and unless otherwise indicated, the term "about" when used in connection with numeric values, parameters or numerical ranges such as amounts, volumes, volume ratios, volume percentages, weight ratios, weight percentages, or application rates of ingredients of a composition, means an amount, a volume, a volume ratio, a volume percentage, a weight ratio, a weight percentage, or an application rate that is recognized by those of ordinary skill in the art to provide a desired effect equivalent to that obtained from the specified amount, volume, volume ratios, volume percentages, weight ratio, weight percentage, or application rate, is encompassed herein and should be construed in light of the number of reported significant digits and applying ordinary rounding techniques.

Any numerical range disclosed herein is meant to include all sub-ranges subsumed within the recited one. For instance, range from 1 to 10 includes all sub-ranges between and including the recited minimal value 1 and the recited maximum value 10 and any value in-between, including any and all decimal values.

Terms "composition" and "formulation" are used interchangeably throughout the text and are meant as having the same meaning.

The abbreviation DAA means days after treatment (application), for example 7 DAA-1 means 7 days after first application.

The BBCH scale is a commonly used scale to identify phenological development stages of plants. The abbreviation BBCH derives from the German terms Biologische Bundesanstalt, Bundessortenamt, and CHemische Industrie (Federal Biological Institute, Federal Department of Agricultural Development, and Chemical Industry). Growth stages are defined according to *Compendium of Growth Stage Identification Keys for Mono- and Dicotyledonous Plants, Extended BBCH scale*, 2nd Edition 1997, ISBN 3-9520749-3-4.

Embodiments

Provided herein are compositions comprising zoxamide in a fungicidally effective amount to control, prevent and/or treat soybean rust. The compositions according to embodiments may be formulated into any customary type of agrochemical compositions, e.g. solutions, emulsions, suspensions, dusts, powders, pastes, granules, pressings, capsules, and mixtures thereof.

Non-limiting examples of composition types include suspensions (e.g. SC, OD, FS), emulsifiable concentrates (e.g. EC), emulsions (e.g. EW, EO, ES, ME), capsules (e.g. CS, ZC), pastes, pastilles, wettable powders or dusts (e.g. WP, SP, WS, DP), pressings (e.g. BR, TB), and granules (e.g. WG, SG, GR).

Application on the crops infested by pests takes place in a customary manner adapted to the application forms. For example, emulsifiable concentrates can be mixed and diluted with suitable solvent to the desired concentration and sprayed on the crops by diverse mechanical or manual sprayers.

In some embodiments, zoxamide compositions can further comprise one or more agrochemically acceptable adjuvants/auxiliaries.

An adjuvant or an auxiliary in the context of embodiments herein is a component that enhances the performance effect of the formulation. Examples of adjuvants/auxiliaries are agents that promote one or more of the following effects: retention, spreading, attachment to the leaf surface, penetration, physical, chemical, technical and/or biological effect. Examples for suitable adjuvants/auxiliaries include solvents, liquid carriers, solid carriers or fillers, surfactants, dispersants, anti-foaming agents, emulsifiers, wetters, adjuvants, solubilizers, penetration enhancers, protective colloids, adhesion agents, thickeners, humectants, repellents, attractants, feeding stimulants, compatibilizers, bactericides, anti-freezing agents, anti-foaming agents, colorants, tackifiers and binders.

All formulations described herein can be produced in a known manner, for example by mixing the active compounds with adjuvants/auxiliaries.

Furthermore, provided herein are methods for controlling, preventing or treating phytopathogenic fungi causing soybean rust wherein the method comprises applying zoxamide, alone or in combination with other ingredients, to the legume plant species.

According to embodiments, one or more active ingredients (compounds) may be applied together with zoxamide to combat soybean rust, such as compounds selected from groups (a)-(i):

(a) benzimidazoles selected from benomyl, carbendazim, fuberidazole, thiabendazole, thiophanate, thiophanate-methyl (b) carboxamides selected from bixafen, boscalid, carboxin, carpropamid, cyflufenamid, diclocymet, ethaboxam, fenhexamid, fenoxanil, flumetover, fluopicolide, fluopyram, flutolanil, furametpyr, isopyrazam, isotianil, mandipropamid, mepronil, oxycarboxin, penflufen, penthiopyrad, picobenzamide, sedaxane, tecloftalam, thifluzamide, tiadinil, tolfenpyrad, silthiofam (c) copper compounds selected from basic copper chloride, basic copper sulfate, copper, copper (nonylphenyl) sulphonate, cupric hydroxide, cupric sulfate pentahydrate, cupric sulfate(anhydrous), DBEDC, dodecylbenzenesulphonic acid bisethylenediamine copper(II) complex, oxine copper (d) dithiocarbamates selected from mancozeb, maneb, manzeb, metiram, polycarbamate, propineb, thiuram, zineb, ziram (e) organochlorine selected from chlorothalonil, fthalide, quintozene (f) pyrimidines selected from bupirimate, cyprodinil, diflumetorim, dimethirimol, fenarimol, ferimzone, mepanipyrim, nuarimol, pyrimethanil (g) pyrrole compounds selected from fenpiclonil, fludioxonil, fluoroimide (h) strobilurins selected from azoxystrobin, dimoxystrobin, fluoxastrobin, kresoxim-methyl, metominostrobin, orysastrobin, picoxystrobin, pyraclostrobin, pyrametostrobin, pyraoxystrobin, trifloxystrobin (i) triazole compounds selected from azaconazole, bitertanol, bromuconazole, cyproconazole, clotrimazole, diclobutrazol, difenoconazole, diniconazole, epoxiconazole, etaconazole, fenbuconazole, fluotrimazole, fluquinconazole, flusilazole, flutriafol, furconazole, hexaconazole, imibenconazole, ipconazole, mefentrifluconazole, metconazole, myclobutanil, penconazole, propiconazole, paclobutrazol, prothioconazole, quinconazole, simeconazole, triazbutil, tebuconazole, tetraconazole, triadimefon, triadimenol, triticonazole, uniconazole.

In embodiments, one or more compounds further applied is selected from groups (a) and/or (b):

(a) strobilurins selected from azoxystrobin, dimoxystrobin, fluoxastrobin, kresoxim-methyl, metominostrobin, orysastrobin, picoxystrobin, pyraclostrobin, pyrametostrobin, pyraoxystrobin, trifloxystrobin.

(b) triazole compounds selected from bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, prothioconazole, simeconazole, tebuconazole, tetraconazole, triadimefon, triadimenol, triticonazole.

In some embodiments, a further compound applied is prothioconazole. Prothioconazole may be applied in amount of about 10 g/ha to about 150 g/ha. In an example embodiment, prothioconazole is applied in amount of about 75 g/ha.

One or more compounds as listed above can be used in treatment simultaneously, prior or post treatment with zoxamide.

According to some embodiments, method of treatment of soybean rust wherein zoxamide is combined with the treatment selected from triazoles and/or strobilurins as listed above which are applied simultaneously, prior or post treatment with zoxamide is also envisaged.

In some embodiments, triazole fungicide is selected from the group consisting of azaconazole, cyproconazole, difenoconazole, flutriafol, metconazole, propiconazole, prothioconazole, tebuconazole or a combination thereof.

In some embodiments, strobilurins are selected from the group consisting of azoxystrobin, fluoxastrobin, kresoxim-methyl, mandestrobin, metominostrobin, picoxystrobin, pyraclostrobin and trifloxystrobin and combinations thereof.

Examples

The following examples are offered by way of illustration and should be recognized by one skilled in the art will recognize as not being limiting.

A field trial was conducted to evaluate the effect and efficacy of zoxamide on soybean rust disease on soybean (*Glycine max*) wherein plants were naturally infected by the disease (*P. pachyrhizi*).

The trial was divided in the following 11 treatments:

TREATMENT 1: One treatment where plants were left untreated and in which natural progression of the disease was observed;

TREATMENT 2: One reference treatment which consisted of chlorothalonil applied in 1.3 kg/ha;

TREATMENT 3: One reference treatment which consisted of treatment with prothioconazole applied in 75 g/ha.

TREATMENT 4: One reference treatment with the mixture of prothioconazole and trifloxystrobin applied in amount of 70 g/ha of prothioconazole and 60 g/ha of trifloxystrobin.

TREATMENT 5: One reference treatment with wherein tebuconazole was applied in amount of 83.3 g/ha; mancozeb in amount of 1000 g/ha and picoxystrobin in amount of 66.6 g/ha.

All four reference treatments (TREATMENTS 2-5) are currently available treatments of soybean rust, wherein the mentioned compositions were prepared from commercially available products prepared according to the respective label instructions and sprayed on the plants in amounts mentioned above and in Table 1 and 2.

TREATMENTS 6-8: Three treatments wherein zoxamide was applied in different doses of (6) 180 g/ha, (7) 120 g/ha, and (8) 90 g/ha.

TREATMENTS 9-11: Three treatments wherein zoxamide was applied together with prothioconazole in the following doses: (9) zoxamide 180 g/ha and prothioconazole 75 g/ha; (10) zoxamide 120 g/ha and prothioconazole 75 g/ha; and (11) zoxamide 90 g/ha and prothioconazole 75 g/ha.

Each of the above treatments was applied on a plot of 3 meters by 6 meters in size and was repeated in 4 replicates.

Zoxamide compositions used in this trial were prepared from the suspension concentrate containing 240 g/L of zoxamide, diluted with water to predetermined concentration, vegetable oil was added to concentration of 0.25% V/V, and such composition was sprayed on the plants in the predetermined amounts.

First application of respective treatments was made when soybean plant reached BBCH growth stages around 60 to 75. Growth stages were defined according to *Compendium of Growth Stage Identification Keys for Mono- and Dicotyledonous Plants, Extended BBCH scale,* 2*nd Edition* 1997, *ISBN* 3-9520749-3-4.

For each treatment, two applications of the respective treatment were made with 14 days interval between.

Disease spread and defoliation were evaluated by visual estimation of degree of infection on leaves and defoliation.

Data and results obtained from the 11 treatments are shown in Table 1 and Table 2.

In Table 1 and Table 2, the following terms have the following meaning: % S—severity; % E—efficacy; 0.0%—disease progressed to maximum; 100.0%—no disease symptoms observed.

TABLE 1

Field Trial-Severity and Efficacy

| No. | | Rating unit | 7 days after first application | | 14 days after first application | | 7 days after second application | | 14 days after second application | | 21 days after second application | |
|---|---|---|---|---|---|---|---|---|---|---|---|---|
| | | | % S | % E | % S | % E | % S | % E | % S | % E | % S | % E |
| 1 | UNTREATED | | 5.00 | N/A | 15.00 | N/A | 21.25 | N/A | 21.25 | N/A | 46.25 | N/A |
| 2 | ZOXAMIDE | 180 g/ha | 0.00 | 100.00 | 0.00 | 100.00 | 0.00 | 100.00 | 0.00 | 100.00 | 4.50 | 90.27 |
| 3 | ZOXAMIDE | 120 g/ha | 0.00 | 100.00 | 0.00 | 100.00 | 0.00 | 100.00 | 3.00 | 85.88 | 8.75 | 81.08 |
| 4 | ZOXAMIDE | 90 g/ha | 0.00 | 100.00 | 0.00 | 100.00 | 3.00 | 85.88 | 5.00 | 76.47 | 13.75 | 70.27 |
| 5 | ZOXAMIDE PROTHIOCONAZOLE | 180 g/ha 75 g/ha | 0.00 | 100.00 | 0.00 | 100.00 | 0.00 | 100.00 | 0.00 | 100.00 | 1.50 | 96.76 |
| 6 | ZOXAMIDE PROTHIOCONAZOLE | 120 g/ha 75 g/ha | 0.00 | 100.00 | 0.00 | 100.00 | 0.00 | 100.00 | 0.00 | 100.00 | 4.50 | 90.27 |
| 7 | ZOXAMIDE PROTHIOCONAZOLE | 90 g/ha 75 g/ha | 0.00 | 100.00 | 0.00 | 100.00 | 3.00 | 85.88 | 5.00 | 76.47 | 8.75 | 81.08 |
| 8 | PROTHIOCONAZOLE | 75 g/ha | 0.00 | 100.00 | 0.00 | 100.00 | 3.00 | 85.88 | 3.00 | 85.88 | 17.50 | 62.16 |
| 9 | CHLOROTHALONIL | 1296 g/ha | 0.00 | 100.00 | 5.00 | 66.67 | 5.00 | 76.47 | 5.00 | 76.47 | 14.75 | 68.11 |
| 10 | PROTHIOCONAZOLE TRIFLOXYSTROBIN | 70 g/ha 60 g/ha | 0.00 | 100.00 | 0.00 | 100.00 | 3.00 | 85.88 | 5.00 | 76.47 | 7.50 | 83.78 |
| 11 | TEBUCONAZOLE MANCOZEB PICOXYSTROBIN | 83.3 g/ha 1000 g/ha 66.6 g/ha | 0.00 | 100.00 | 0.00 | 100.00 | 3.00 | 85.88 | 3.00 | 85.88 | 6.25 | 86.49 |

TABLE 2

Field Trial-Defoliation Percent

| No. | | Rating unit | 21 days after second application | | 28 days after second application | |
|---|---|---|---|---|---|---|
| | | | Defoliation % | Efficacy % | Defoliation % | Efficacy % |
| 1 | UNTREATED | | 81.25 | N/A | 100.00 | N/A |
| 2 | ZOXAMIDE | 180 g/ha | 42.50 | 47.69 | 51.25 | 48.75 |
| 3 | ZOXAMIDE | 120 g/ha | 48.75 | 40.00 | 60.00 | 40.00 |
| 4 | ZOXAMIDE | 90 g/ha | 52.50 | 35.38 | 70.00 | 30.00 |
| 5 | ZOXAMIDE PROTHIOCONAZOLE | 180 g/ha 75 g/ha | 40.00 | 50.77 | 45.00 | 55.00 |
| 6 | ZOXAMIDE PROTHIOCONAZOLE | 120 g/ha 75 g/ha | 45.00 | 44.62 | 51.25 | 48.75 |
| 7 | ZOXAMIDE PROTHIOCONAZOLE | 90 g/ha 75 g/ha | 50.00 | 38.46 | 60.00 | 40.00 |
| 8 | PROTHIOCONAZOLE | 75 g/ha | 50.00 | 38.46 | 70.00 | 30.00 |
| 9 | CHLOROTHALONIL | 1296 g/ha | 50.00 | 38.46 | 60.00 | 40.00 |
| 10 | PROTHIOCONAZOLE TRIFLOXYSTROBIN | 70 g/ha 60 g/ha | 38.75 | 52.31 | 55.00 | 45.00 |
| 11 | TEBUCONAZOLE MANCOZEB PICOXYSTROBIN | 83.3 g/ha 1000 g/ha 66.6 g/ha | 45.00 | 44.62 | 56.25 | 43.75 |

Unless otherwise defined, all technical and scientific terms used herein have the same meaning as commonly understood by one of ordinary skill in the art to which the invention belongs. The terminology used in the description herein is for describing particular embodiments only and is not intended to be limiting. As used in the specification and appended claims, the singular forms "a," "an," and "the" are intended to include the plural forms as well, unless the context clearly indicates otherwise.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method for controlling and/or treating of phytopathogenic fungi causing soybean rust infections in plants, the method comprising:
applying to the plants, and/or seeds of the plants, or soil in which the plants are growing, or soil in which the plants are desired to grow, a fungicidally effective amount of a composition containing one or more active ingredient selected from the group consisting of zoxamide alone, and zoxamide in combination with one or more additional active ingredients selected from the group consisting of strobilurins and/or triazole compounds, wherein:
the strobilurins are selected from the group consisting of azoxystrobin, dimoxystrobin, fluoxastrobin, kresoxim-methyl, metominostrobin, orysastrobin, picoxystrobin, pyraclostrobin, pyrametostrobin, pyraoxystrobin, and trifloxystrobin; and
the triazole compounds are selected from the group consisting of bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, prothioconazole, simeconazole, tebuconazole, tetraconazole, triadimefon, triadimenol, and
wherein:
the phytopathogenic fungi are selected from *P. pachyrhizi* or *P. meibomiae*; and
the zoxamide is applied in an amount of about 10 g/ha to about 2000 g/ha.

2. The method of claim 1, wherein the plants are selected from soybean, bean, kudzu, and pea.

3. The method of claim 1, wherein the composition is applied as a foliar treatment.

4. The method of claim 1, wherein the composition is applied by spraying or dusting.

5. The method of claim 1, wherein zoxamide is applied in an amount of about 100 g/ha to about 500 g/ha.

6. The method of claim 1, wherein zoxamide is applied in an amount of about 50 g/ha to about 200 g/ha.

7. The method of claim 1, wherein zoxamide is applied in an amount of about 90 g/ha to about 180 g/ha.

8. The method of claim 1, wherein zoxamide is applied in an amount of about 90 g/ha.

9. The method of claim 1, wherein zoxamide is applied in an amount of about 120 g/ha.

10. The method of claim 1, wherein zoxamide is applied in an amount of about 180 g/ha.

11. The method of claim 1, comprising applying the zoxamide in combination with the one or more additional active ingredients selected from the group consisting of strobilurins and/or triazole compounds, wherein:
the strobilurins are selected from the group consisting of azoxystrobin, dimoxystrobin, fluoxastrobin, kresoxim-methyl, metominostrobin, orysastrobin, picoxystrobin, pyraclostrobin, pyrametostrobin, pyraoxystrobin, and trifloxystrobin, and
the triazole compounds are selected from the group consisting of bitertanol, bromuconazole, cyproconazole, difenoconazole, diniconazole, epoxiconazole, etaconazole, fenbuconazole, fluquinconazole, flusilazole, flutriafol, hexaconazole, imibenconazole, ipconazole, mefentrifluconazole, metconazole, myclobutanil, penconazole, propiconazole, prothioconazole, simeconazole, tebuconazole, tetraconazole, triadimefon, triadimenol, and triticonazole.

12. The method of claim 11, wherein the one or more additional active ingredients comprises prothioconazole.

13. The method of claim 12, wherein the prothioconazole is applied in an amount of 75 g/ha.

14. The method of claim 11, wherein the one or more additional active ingredient comprises tebuconazole, and wherein applying the zoxamide in combination with the one or more additional active ingredients comprises:
applying the zoxamide to the plants and/or seeds of the plants; and
applying the one or more additional active ingredient to the plants and/or seeds of the plants before applying the zoxamide, or simultaneously with applying the zoxamide, or after applying the zoxamide.

15. The method of claim 1, further comprising applying auxiliaries together with the zoxamide.

* * * * *

UNITED STATES PATENT AND TRADEMARK OFFICE
CERTIFICATE OF CORRECTION

PATENT NO. : 11,937,601 B2
APPLICATION NO. : 17/225471
DATED : March 26, 2024
INVENTOR(S) : Stefaan Reybrouck and Koen Quaghebeur It is certified that error appears in the above-identified patent and that said Letters Patent is hereby corrected as shown below:

In the Claims

In Column 9, Line(s) 27, Claim 1, after "and", insert --triticonazole,--.

Signed and Sealed this
Second Day of July, 2024

Katherine Kelly Vidal
*Director of the United States Patent and Trademark Office*